(12) United States Patent
Dare et al.

(10) Patent No.: US 11,016,657 B2
(45) Date of Patent: May 25, 2021

(54) ELECTRONIC DEVICE FOR INTERACTING WITH CUSTOM USER INTERFACE ELEMENTS

(71) Applicant: Amazon Technologies, Inc., Seattle, WA (US)

(72) Inventors: Nicole Dare, Shoreline, WA (US); Marc Hensley, Seattle, WA (US); Paul Warren Smart, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 500 days.

(21) Appl. No.: 15/457,869

(22) Filed: Mar. 13, 2017

(65) Prior Publication Data

US 2018/0260107 A1   Sep. 13, 2018

(51) Int. Cl.
*G06F 3/048* (2013.01)
*G06F 3/0488* (2013.01)
(Continued)

(52) U.S. Cl.
CPC ........ *G06F 3/04883* (2013.01); *G06F 3/0362* (2013.01); *G06F 3/0488* (2013.01); *G06F 3/04842* (2013.01); *G06Q 30/0633* (2013.01); *G06Q 30/0641* (2013.01); *H04M 1/72412* (2021.01); *A44B 15/005* (2013.01)

(58) Field of Classification Search
CPC .. G06F 3/04883; G06F 3/0362; G06F 3/0482; G06F 3/048; G06F 3/04842; G06F 3/0488; G06F 3/0483; G06Q 30/0633; G06Q 30/0641; A44B 15/005
See application file for complete search history.

(56) References Cited

U.S. PATENT DOCUMENTS

| 9,563,877 B2 | 2/2017 | Macbeth et al. |
| 2004/0003406 A1 | 1/2004 | Billmaier |

(Continued)

FOREIGN PATENT DOCUMENTS

EP   2746926 A2   6/2014

OTHER PUBLICATIONS

International Search Report and Written Opinion in PCT/US2018/021160 dated May 28, 2018.
(Continued)

*Primary Examiner* — Mahelet Shiberou
(74) *Attorney, Agent, or Firm* — Knobbe Martens Olson & Bear LLP

(57) ABSTRACT

An electronic device is described that displays and enables interaction with custom user interface ("UI") elements. The electronic device may include a display, an actuatable button, and controls enabling user selection of individual custom UI elements. The device may determine a category of custom UI elements to display based on geolocation data, previous interactions with custom UI elements, user preferences, or other information, and may display a custom UI elements from the category. When the button is actuated, the electronic device causes an action associated with the displayed custom UI element to be performed. The electronic device may additionally display details regarding the action to be performed, status information regarding a previously performed action, or other related information.

20 Claims, 9 Drawing Sheets

(51) Int. Cl.
*G06F 3/0362* (2013.01)
*G06Q 30/06* (2012.01)
*G06F 3/0484* (2013.01)
*H04M 1/72412* (2021.01)
*A44B 15/00* (2006.01)

(56) References Cited

U.S. PATENT DOCUMENTS

| | | | |
|---|---|---|---|
| 2007/0171196 A1* | 7/2007 | Pfingsten | G05B 19/108 345/156 |
| 2009/0006988 A1* | 1/2009 | Lu | G06Q 30/0633 715/762 |
| 2009/0112474 A1 | 4/2009 | Chakrapani et al. | |
| 2010/0185989 A1 | 7/2010 | Shiplacoff et al. | |
| 2010/0257479 A1 | 10/2010 | Do et al. | |
| 2010/0332337 A1* | 12/2010 | Bullock | G06Q 20/12 705/26.82 |
| 2011/0231224 A1 | 9/2011 | Winters | |
| 2011/0231225 A1 | 9/2011 | Winters | |
| 2012/0278203 A1* | 11/2012 | Ojadidi | G06Q 30/0641 705/27.1 |
| 2013/0317938 A1* | 11/2013 | Zhao | G06Q 30/0207 705/26.8 |
| 2014/0007012 A1 | 1/2014 | Govande et al. | |
| 2015/0006314 A1 | 1/2015 | Goulart et al. | |
| 2015/0193857 A1* | 7/2015 | Reed | G06Q 30/0633 705/26.8 |
| 2015/0253885 A1 | 9/2015 | Kagan et al. | |
| 2015/0277681 A1* | 10/2015 | Isaacson | G06F 3/0484 705/26.8 |
| 2016/0054791 A1 | 2/2016 | Mullins et al. | |
| 2016/0117068 A1* | 4/2016 | Greenberg | G06F 40/134 715/277 |
| 2017/0011337 A1* | 1/2017 | Matityaho | G06Q 10/08 |
| 2018/0060944 A1* | 3/2018 | Chefalas | G06Q 50/01 |
| 2018/0157411 A1* | 6/2018 | Kim | G06K 9/0004 |
| 2018/0324048 A1* | 11/2018 | Lee | H04L 41/0889 |

OTHER PUBLICATIONS

Roberts, Emily, 'Introducing the Amazon Dash Button and Dash Replenishment Service,' Amazon 2 Appstore Biogs, dated Mar. 31, 2015, retrieved Oct. 25, 2016, available at https://developer.amazon.com/blogs/appstore/post/Tx3N3VXX052B1 SI/introducing-the-amazon-dashbutton-and-dash-replenishment-service.
International Preliminary Report on Patentability in PCT/US2018/021160 dated Sep. 17, 2019.

* cited by examiner

ELECTRONIC DEVICE FOR INTERACTING WITH CUSTOM USER INTERFACE ELEMENTS

BACKGROUND

Generally described, operators of computing services may provide user interfaces ("UIs") that enable users to browse and select from among the available services. A graphical user interface may facilitate access to multiple services, using search fields, hierarchical menus, and other UI controls. For example, user interfaces associated with one or more services may be presented for display by a browser application or other application operating on a computer or a mobile phone. Such user interfaces may enable a user to search, browse and/or request other actions to be performed with respect to items offered by the service.

Users of computing services may thus perform various actions related to the services by invoking various controls of the provided user interfaces. However, the functionality of these user interfaces may be compromised by the need to facilitate access to a large number of services, and the resulting complexity of the user interfaces may reduce utilization of the computing services.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1A:
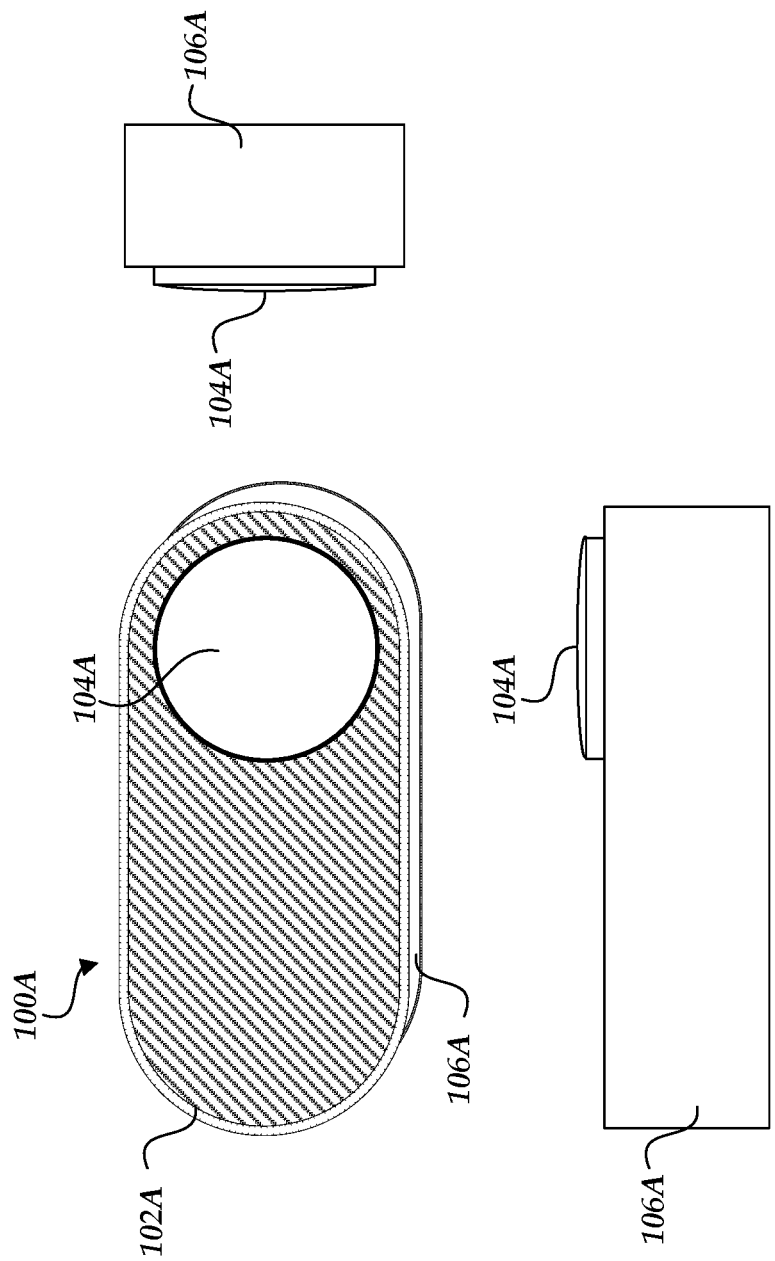
FIGS. 1A-1E are pictorial drawings that depict various embodiments of an electronic device for interacting with custom user interface elements.

Generally described, aspects of the present disclosure relate to electronic devices. More specifically, aspects of the present disclosure are directed to comparatively simple, dedicated electronic devices for presenting, selecting, and interacting with custom UI elements. As used herein, a "custom UI element" may generally refer to a user interface element that is associated with a customizable action. For example, a user interface may display a custom UI element next to a button that, if pressed, causes the action associated with the custom UI element to be performed. Illustratively, an electronic device may include a touchscreen display and an actuatable button, and may display at a given time a single custom user interface element (or a portion of a custom user interface element) from a set of custom user interface elements. The touchscreen may enable user input that is processed by the electronic device, and the device may select and display a different custom UI element based on the received user input. For example, in one embodiment, the electronic device may present custom UI elements in the form of a vertically scrollable list that extends beyond the boundaries of the touchscreen display, and may receive and process touch gestures (e.g., swiping up or down on the touchscreen) to cause a different custom UI element to scroll into view.

When the actuatable button is pressed, the electronic device may cause an action associated with the currently displayed custom UI element to be performed. For example, a custom UI element may include a "Product X" logo, and may be associated with an action such as placing an order for Product X. The electronic device may display the custom UI element and/or the Product X logo, and may cause an order to be placed for the product when the button is pressed. If, however, the user instead makes a touch gesture on the touchscreen, the electronic device may process the touch gesture to display a different custom UI element, such as a custom UI element including a "Product Y" logo. As used herein, the term "actuatable" refers to a control, such as a physical button, that is configured to respond to an input, such as a press, tap, long press, swipe, or any other input. The term "actuation," in turn, refers to the input to which the control is configured to respond. Embodiments of an "actuatable button" thus include a button that responds to being pressed, a button that responds to a tap, a button that responds to a long press, and so forth, depending on the embodiment. It will also be understood that references herein to a button being pressed, tapped, etc., include embodiments in which the button is responsive to other input or inputs.

The electronic device may process a number of touch gestures and may perform various actions (or cause actions to be performed) in response to the touch gestures. For example, the electronic device may process a tap gesture on the touchscreen as a request for additional information regarding the action that will be performed if the button is pressed while the device is displaying a particular custom UI element. The electronic device may thus display information regarding the action. For example, if the action to be performed is to place an order for a product, the device may display information such as an order quantity, product size, shipping address, payment method, and other details. As a further example, if the action to be performed is to change the date of a scheduled delivery, the device may display information such as the original delivery date and the revised delivery date.

In some embodiments, the electronic device may be configured to select a category of custom UI elements, and display elements from that category. In some such embodiments, the electronic device may be portable. For example, the device may have a size and shape suitable for carrying in a pocket, purse, or on a key ring. In one embodiment, the device's widest dimension is approximately three inches. The device may include geolocation sensors that enable collection of location information. The device may thus obtain location information and select a category of custom UI elements based on the location information. In various embodiments, categories of custom UI elements may be associated with a particular location or area. For example, a first set of custom UI elements may be associated with placing orders for items such as laundry detergent, stain remover, fabric softener, and the like. This set of custom UI elements may be associated with a laundry room, such that the electronic device will detect that it is in the laundry room, select the "laundry" category of custom UI elements, and display individual elements from that category. Similarly, a second category of custom UI elements may include elements associated with ordering perishable items, and the second category may be associated with a kitchen, a pantry, and/or a grocery store.

In further embodiments, the electronic device may be installed in a particular location. For example, the device may be installed in the arm of a seat at a movie theater, stadium, arena, or other venue, and may display custom UI elements from a category associated with that venue. As a further example, the device may be permanently or temporarily mounted on the wall of an office supply closet, and may obtain its location and display custom UI elements from an "office supplies" category. In still further embodiments, the electronic device may select a category of custom UI elements based on criteria, such as a time of day, day of the week, rate of movement, or various combinations of these and other criteria.

In other embodiments, the electronic device may generate or receive a category of custom UI elements. For example, the electronic device may create and maintain a "recent orders" category, and may display custom UI elements from that category. As a further example, the electronic device may receive and display a user-defined category of custom UI elements, such as favorites or "wish list" items.

The electronic device may process further user inputs. For example, the electronic device may process inputs such as a tap and hold, long press, swiping left or right, scrolling to the top or bottom of a list, scrolling past the top or bottom of the list, and the like to enable interactions such as selecting a category of custom UI elements, editing or removing an element, changing the order of elements, displaying action status or action detail information associated with a particular element, displaying battery information, entering a pairing or configuration mode, selecting a wireless network, or other interactions.

The electronic device may, in some embodiments, determine a verification step to be performed when the actuatable button is pressed. The verification step may determine whether various conditions are met at the time when the button is actuated, which in turn may be used to determine whether to perform the default action or an alternative action. For example, the default action may be to place an order using a free next-day shipping parameter, the alternative action may be to prompt the user to renew membership in a group or subscription program that is eligible for free next-day shipping, and the verification step may be to confirm that the user is still a member of the group. As a further example, the parameters associated with an action may be a 32-ounce size and a $7.95 price, and the verification step may be to determine whether another size is available at a lower price per ounce. In some embodiments, the electronic device may display a prompt or other information asking the user to confirm the action to perform, and may receive user input confirming or canceling the action.

In some embodiments, the electronic device may be equipped with a camera, bar code reader, RFID tag reader, or other input device that enables the device to recognize products and generate custom UI elements. In other embodiments, the electronic device may be in communication with such input devices via a network interface. For example, a bar code reader may scan the UPC code of a box of breakfast cereal, and may transmit that information to the electronic device. The electronic device may receive the information, and in turn may generate a custom UI element with an associated action of placing an order for the cereal.

FIG. 1A is a pictorial drawing of a first embodiment of an electronic device 100A as viewed from various perspectives. In the illustrated embodiment, the device 100A includes a touchscreen 102A, an actuatable button 104A, and a housing 106A, which may house various components such as a printed circuit board including a processor 502, memory 520, and other components illustrated architecturally in FIG. 5, as well as other hardware components not depicted in FIGS. 1A-1D such as antennas, connection ports, a global positioning system (GPS) receiver, a power source such as a battery (which may be rechargeable via a charging port), a power control unit, haptic feedback mechanisms, and the like. In the illustrated embodiment, the touchscreen 102A is shaded with diagonal lines to show the area of the upper surface of the device 100A that it covers. As shown, the touchscreen 102A surrounds the button 104A, and is operable to receive touch inputs and display output across the shaded area. The button 104A has a slightly domed surface which, when pressed, actuates the button and may cause it to partially recess into the housing 106A. In some embodiments, the button 104A may provide haptic feedback (e.g., vibration), audio feedback, visual feedback via the touchscreen 102, or may provide other non-mechanical feedback when touched, either with or without movement of the button 104A.

Figure 1B:
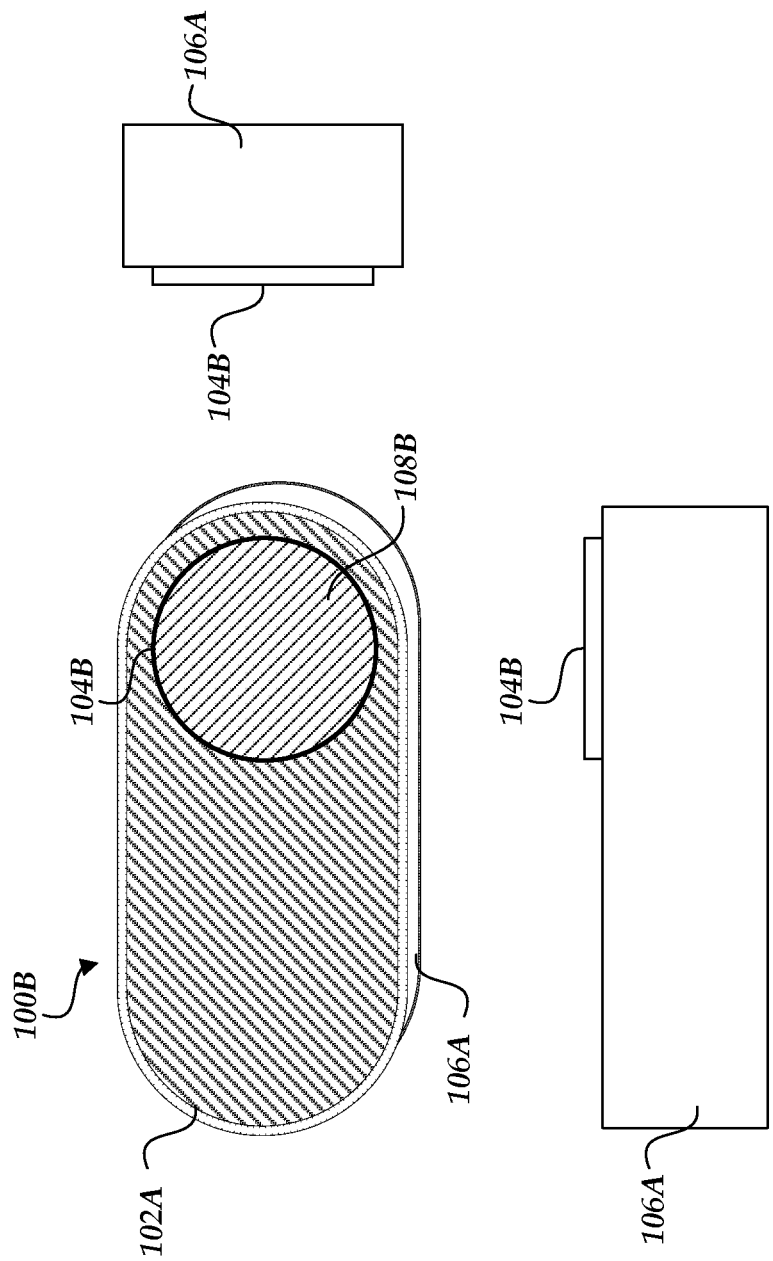

FIG. 1B is a pictorial drawing of a second embodiment of an electronic device 100B as viewed from various perspectives. The touchscreen 102A, actuatable button 104B, and housing 106A are functionally identical to the same components in FIG. 1A. However, in the embodiment of FIG. 1B, a second display screen 108B covers the top of the button 104B, and the button 104B has a flat surface rather than being slightly domed. In some embodiments, the display screen 108B may also be a touchscreen, and the electronic device 100B may process inputs from the touchscreen 102A and display screen 108B as separate or combined inputs. By using the display screen 108B in conjunction with the touchscreen 102A, a user interface may be displayed across the entire surface of the electronic device 100B while allowing the actuatable button 104B to provide independent mechanical feedback in response to being pressed.

Figure 1C:
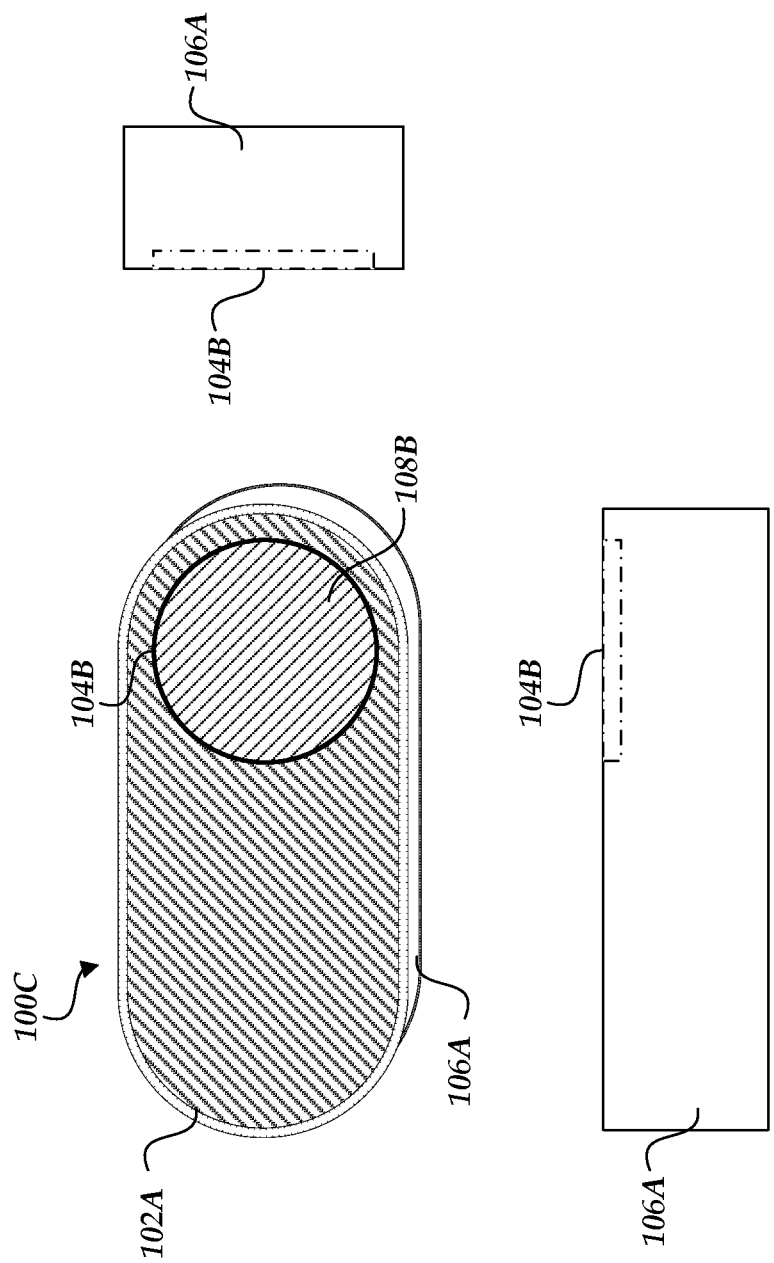

FIG. 1C is a pictorial drawing of a third embodiment of an electronic device 100C as viewed from various perspectives, and varies from FIG. 1B in that the actuatable button 104B is flush with the surface of the touchscreen 102A. In some embodiments, the button 104B may recess further into the housing 106A when pressed. In further embodiments, the housing 106A may include a haptic feedback mechanism that provides feedback, such as a vibration, when the button 104B is pressed. In still further embodiments, the touchscreen 102A and display screen 108B may be implemented as a single touchscreen that displays a virtual button, and the haptic feedback mechanism may provide feedback when the virtual button is pressed.

Figure 1D:
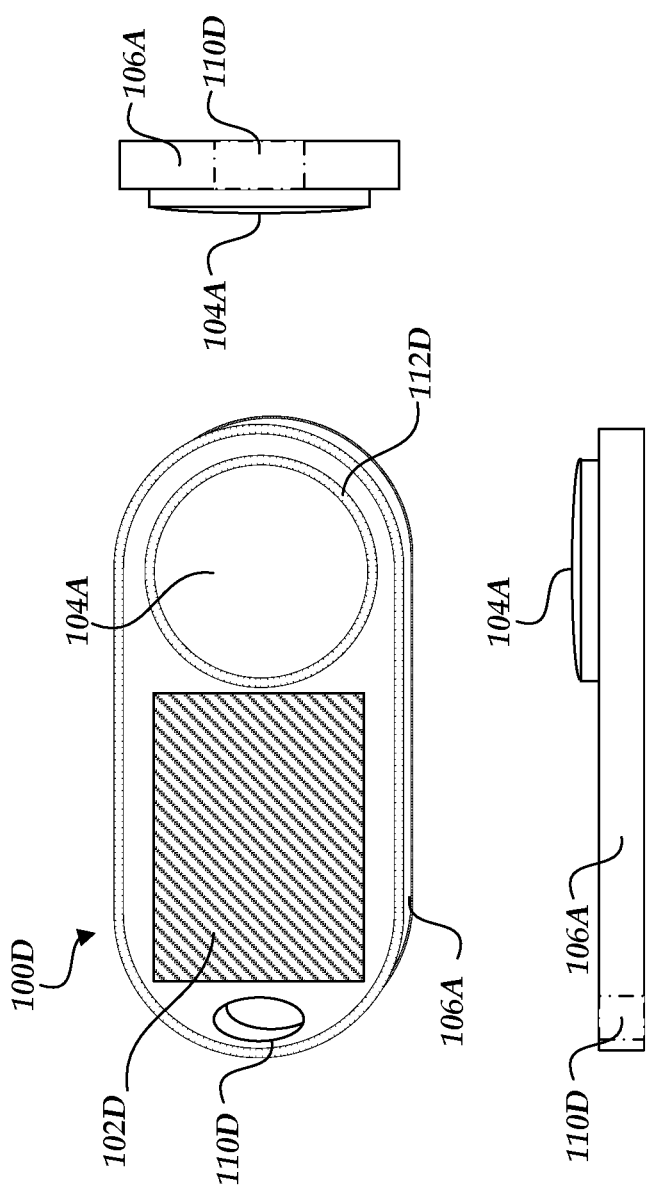

FIG. 1D is a pictorial drawing of a fourth embodiment of an electronic device 100D as viewed from various perspectives. In FIG. 1D, the touchscreen 102D covers a smaller portion of the top surface of the housing 106A, and the housing 106A is reduced in height as compared to FIGS. 1A-1C. The housing 106A also includes a keychain hole 110D, which extends through the housing 106A as shown. The button 104A, while otherwise as depicted in FIG. 1A, is encircled by a feedback light 112D, which may illuminate when the button 104A is pressed. In some embodiments, the feedback light 112D may display various effects, such as a gradual change in light level, an animated drawing of the circle around the button 104A, or other visual effects. For example, in some embodiments, certain actions may be performed in response to a "long press" whereby a user holds the button 104A in a depressed position for at least a threshold amount of time. The feedback light 112D may visually indicate the progress toward the button being pressed for the requisite amount of time.

Figure 1E:
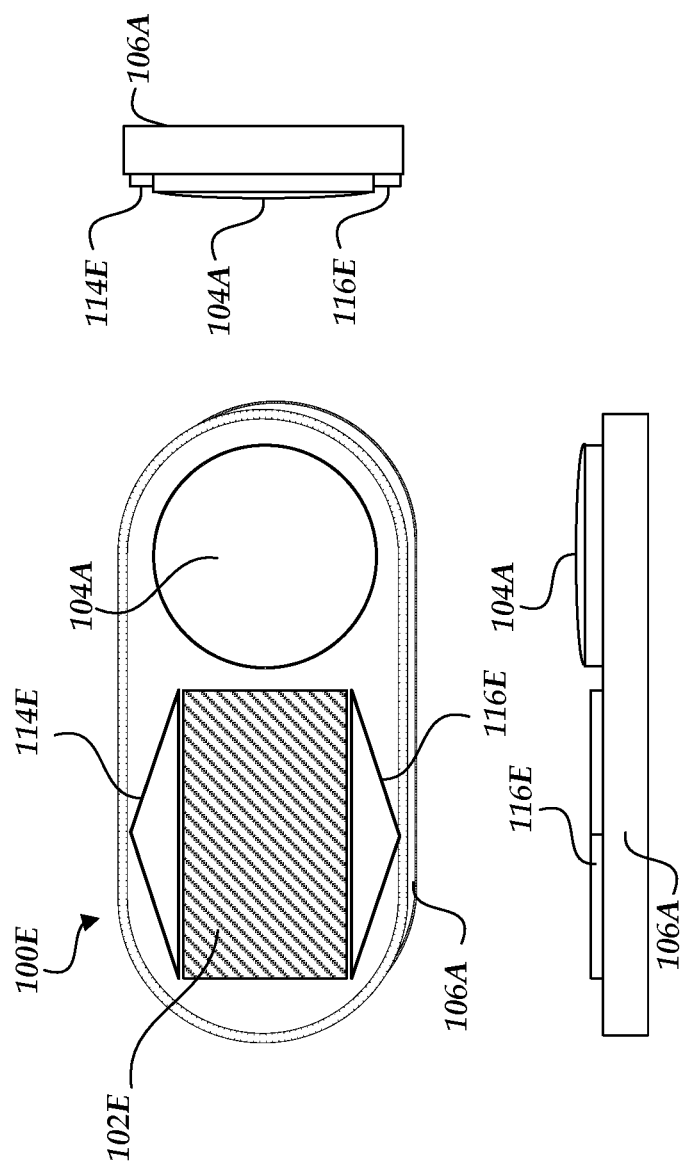

FIG. 1E is a pictorial drawing of a fifth embodiment of an electronic device 100E as viewed from various perspectives. In FIG. 1E, the electronic device 100E includes a display screen 102E rather than a touchscreen, and further includes hardware buttons 114E and 116E. The hardware buttons 114E and 116E may be configured such that the electronic device 100E processes actuation of the hardware button 114E in similar fashion to the processing of a touchscreen gesture (e.g., a "swipe down" gesture) by devices 100A-D, and that the electronic device 100E processes actuation of the hardware button 116E in similar fashion to the processing of a touchscreen gesture (e.g., a "swipe up" gesture) by devices 100A-D.

It will be understood that the embodiments illustrated in FIGS. 1A-1E are for purposes of example, and that other embodiments are within the scope of the present disclosure. It will be further understood that the components illustrated in FIGS. 1A-1E may be included, excluded, or combined in various embodiments. For example, the keychain hole 110D and/or feedback light 112D may be included in the embodiment illustrated in FIG. 1A. As further examples, the keychain hole 110D may be implemented as a pair of connected holes on the side of the housing 106A, the button 104A may be implemented across the entire surface of the housing 106A, or the shapes of the touchscreen 102A, button 104A, housing 106A, and other components may vary from the illustrated embodiments. Still further, aspects of the present disclosure include wearable devices and "smart home" devices, as well as devices built into home appliances, consumer electronics, home or office furniture, vehicles, and other products. Illustratively, the control or controls for navigating a list of custom UI elements, and for causing display of a particular custom UI element, may include a touchscreen, button or buttons, dial, knob, slider, switch, or any other physical control. Similarly, the display that presents the particular custom UI element may be coupled to or combined with physical controls in various embodiments. For example, an electronic device may be implemented as a dial or knob having a display on its surface, and the dial may be turned to change the display and pressed to actuate the control.

Figure 2A:
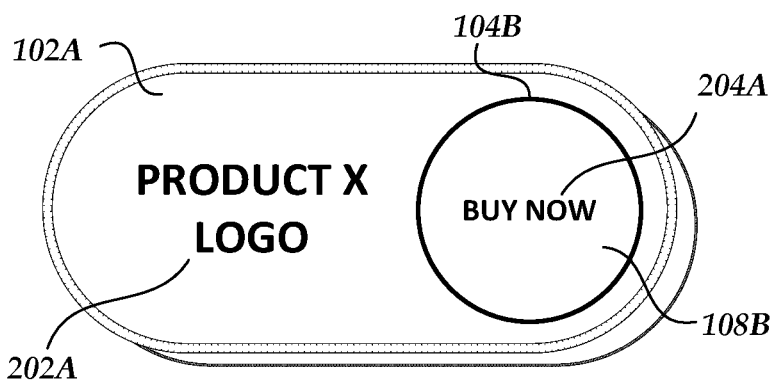
FIGS. 2A-2D are illustrative user interfaces that depict interaction with custom user interface elements.

FIGS. 2A-2D depict illustrative user interfaces of an electronic device that implements aspects of the present disclosure, such as electronic device 100B of FIG. 1B. In FIG. 2A, the touchscreen 102A depicts a product logo 202A, which may represent a portion or the whole of a custom UI element. In various embodiments, part or all of a custom UI element may be displayed on the touchscreen 102A, the display screen 108B, or both. In the illustrated embodiment, the display screen 108B depicts textual information 204A that provides information about the action that will be performed if the button 104A is pressed. For example, the textual information 204A may indicate an order will be placed for "Product X," whose logo 202A is depicted on the touchscreen 102A, if the button 104A is pressed.

Figure 2B:
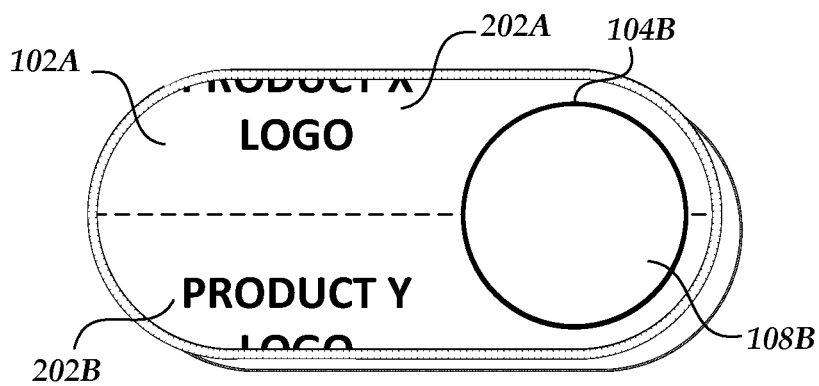

FIG. 2B depicts a second illustrative user interface that may be displayed in response to a user input, such as a touch gesture (e.g., an upward swipe gesture) on the touchscreen 102A. In the illustrated embodiment, the touchscreen 102A displays the product logo 202A scrolling vertically out of view. The touchscreen 102A further displays the product logo 202B (which may represent all or part of a second custom UI element) scrolling into view. In the illustrated embodiment, a dotted line is shown between product logos 202A and 202B, which may represent a change in background color or shading. In some embodiments, there is not a visible demarcation between the product logos 202A and 202B. Additionally, in various embodiments, the textual information 204A (not shown in FIG. 2B) may scroll vertically with the product logo 202A, fade, or disappear. These changes to the appearance of button 104A may, in some embodiments, indicate that pressing button 104A will not cause an action while the displayed custom UI element is in a state of transition.

Figure 2C:
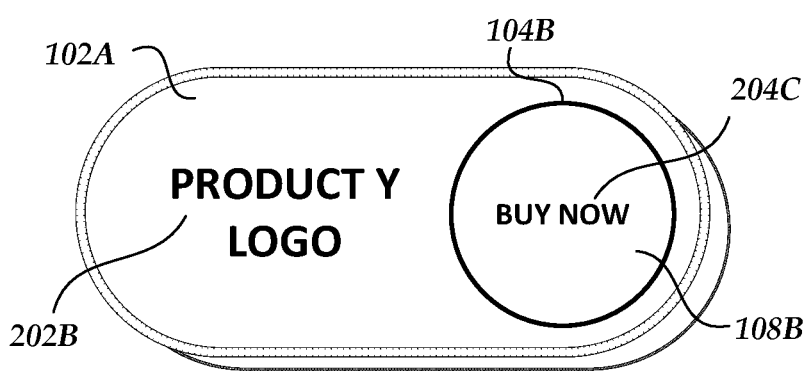

FIG. 2C depicts a third illustrative user interface that may be displayed at a later time, such as after the completion of the touch gesture that caused product logo 202A to scroll out of view. In FIG. 2C, the touchscreen 102A now displays product logo 202B, and the display screen 108B now displays textual information 204C corresponding to the action that will be performed if the button 104A is pressed while the product logo 202B is displayed. Additionally, the textual information 204C may be the same as or different than the textual information 204A, depending on whether the action to be performed varies between the previously displayed custom UI element and the currently displayed custom UI element. For example, the second custom UI element may be associated with a "add to shopping cart" action, and the textual information 204C may indicate that the latter action will be performed. In further embodiments, the textual information 204A and 204B may be omitted or may be displayed independently of the display screen 108B (e.g., on touchscreen 102A).

Figure 2D:
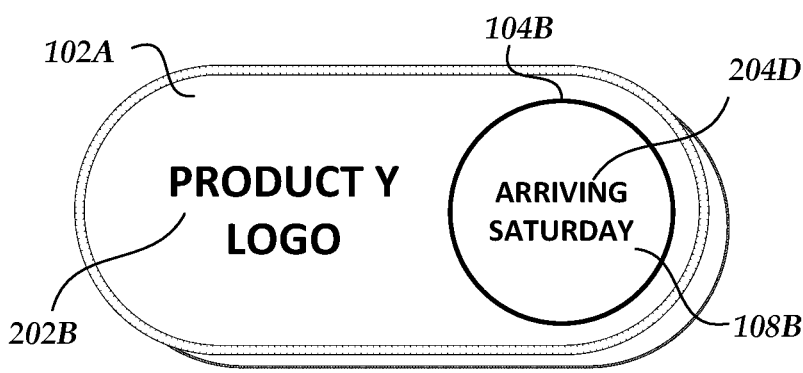

FIG. 2D depicts a fourth illustrative user interface that may be displayed after the button 104A has been pressed. In the illustrated user interface, the display screen 108B displays updated textual information 204D indicating that the action associated with the displayed custom UI element is being performed. In some embodiments, the electronic device limits or throttles the number of actions simultaneously performed with regard to a specific custom UI element, and the textual information 204D indicates that a further action will not be performed while the first action is in progress. In other embodiments, pressing the button 104A while the textual information 204D is displayed may modify the action being performed or cause an additional action to be performed. For example, pressing the button 104A while the display screen 108B is displaying updated textual information 204D may cause the electronic device to change the delivery method associated with an order (e.g., from standard delivery to rush delivery), or to place a second order for the item. In further embodiments, the electronic device may display a confirmation message on the display screen 108B, which prompts the user to perform an additional action (e.g., pressing the button 104A again, holding down the button 104A, etc.) to confirm the change or the additional action.

In some embodiments, textual information 204D regarding the status of an action may be displayed on the touchscreen 102A. For example, the touchscreen 102A may display textual information 204D as an overlay atop the product logo 202A or 202B, or may display textual information 204D if the user swipes left or right, if the user taps and holds a product logo 202A or 202B, or in response to other user input.

Figure 3:
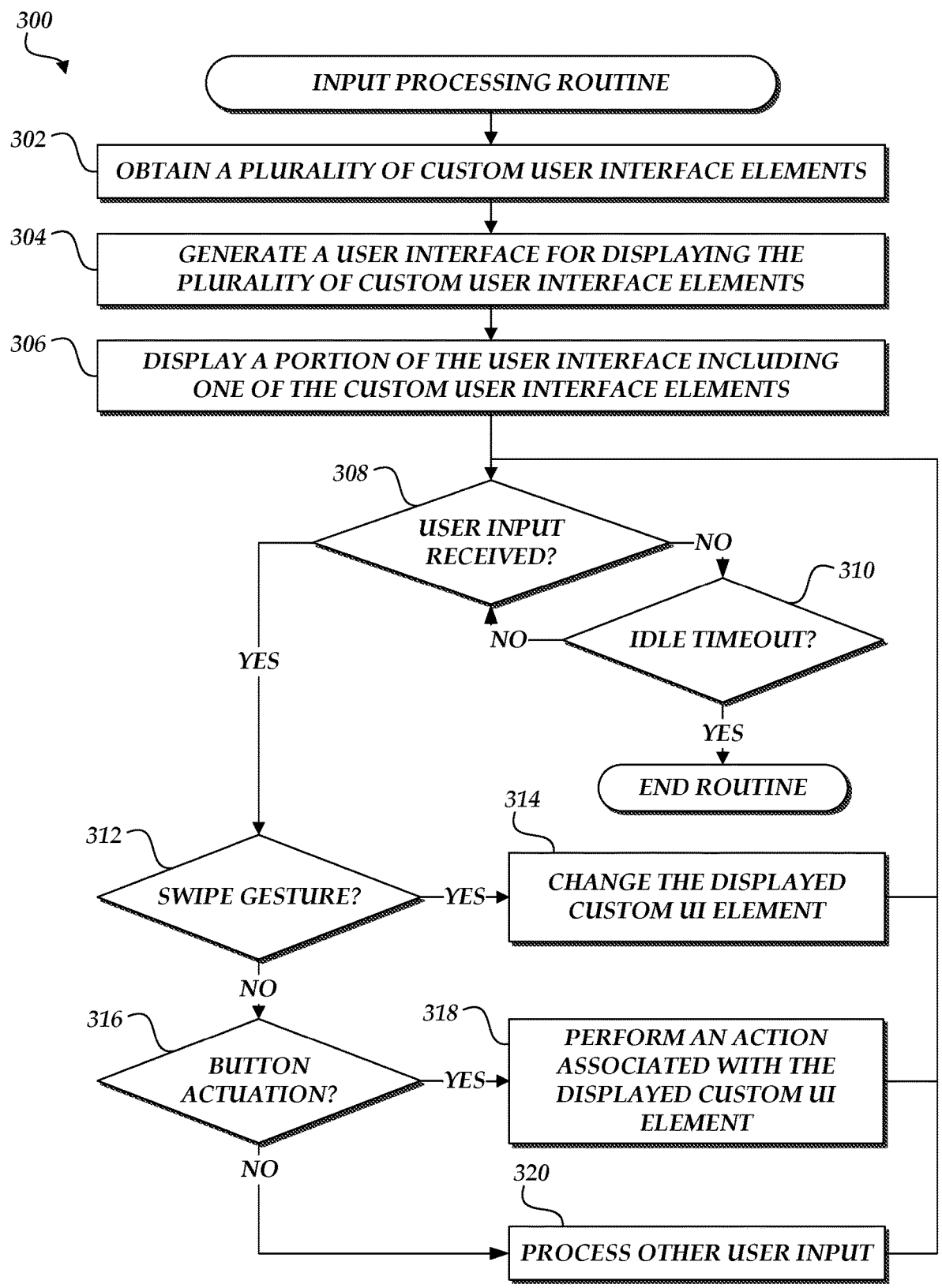
FIG. 3 is a flow diagram depicting an illustrative routine for processing inputs received by an electronic device in accordance with aspects of the present disclosure.

FIG. 3 is a flow diagram depicting an illustrative input processing routine 300. The illustrative routine 300 may be performed, for example, by an electronic device such as one of electronic devices 100A-D. The routine may be implemented, for example, in whole or in part by the user interface module 524 of FIG. 5, which will be described below. At block 302, a plurality of custom UI elements may be obtained. In some embodiments, the plurality of custom UI elements may be obtained from a networked data store, such as the custom UI element data store 560 of FIG. 5. In other embodiments, a network-based service (which may operate on a server) may provide the custom UI elements or data from which the electronic device may generate the custom UI elements. The custom UI elements and/or associated data may be provided to the electronic device in response to a request from the electronic device, or may be initiated by the network-based service (such as by employing a "push" model) on a periodic basis or in response to a change in one or more custom UI elements (or in one or more associated actions) detected by the network-based service. In other embodiments, the plurality of custom UI elements may be obtained from a local data store, such as the data store 510 of FIG. 5. In some embodiments, each of the plurality of custom UI elements may be associated with a respective action. In other embodiments, the routine 300 may obtain a plurality of actions and/or items, and may generate or obtain elements corresponding to each action and/or item.

Figure 5:
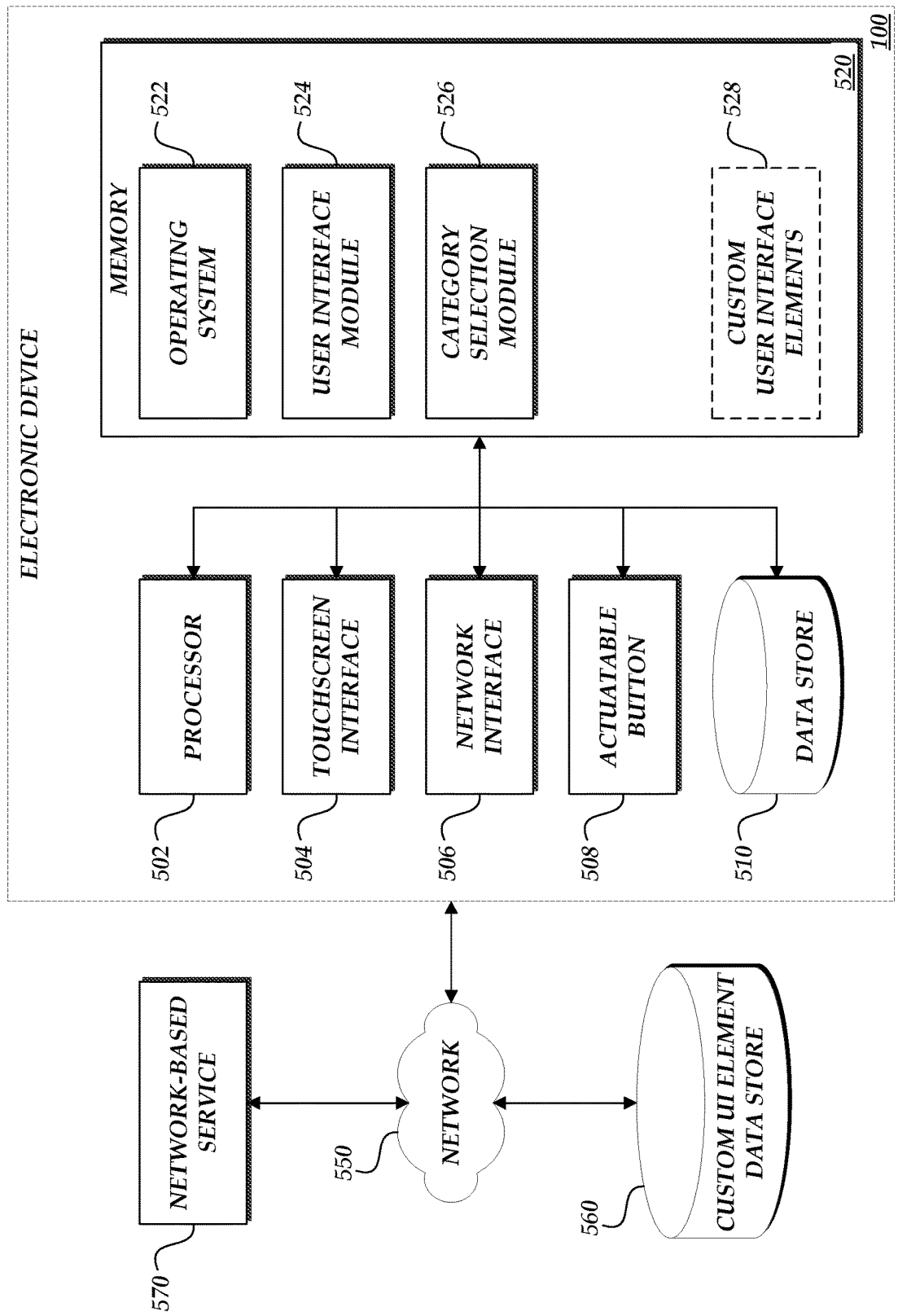
FIG. 5 is an illustrative network topology depicting a general architecture of an example electronic device configured to implement aspects of the present disclosure.

In some embodiments, the plurality of custom UI elements may be obtained by transmitting a request to a service, such as the network-based service 570 of FIG. 5. The request may include information identifying the electronic device, information regarding a location of the electronic device, information identifying a user or an account associated with the electronic device, and/or information regarding prior usage of the electronic device. In further embodiments, the electronic device may be preconfigured to request a particular set or category of custom UI elements, or may be preconfigured with custom UI elements that are obtained from a local data store, such as the data store 510 of FIG. 5. The local data store may be prepopulated with custom UI elements that are requested or received from a networked service prior to execution of the routine 300. In some embodiments, the routine 300 may select a plurality of custom UI elements from a larger set of custom UI elements stored in the local data store, using selection criteria such as time of day, device location, a device usage history, or other information.

At block 304, a user interface may be generated for displaying the plurality of custom UI elements. For example, one or more of the user interfaces depicted in FIGS. 2A-D may be generated. Illustratively, the generated user interface may be larger than the electronic device can display in full. For example, the user interface may be a list, grid, or hierarchy of custom UI elements. At block 306 the electronic device may display a portion of the user interface, such as a single custom UI element.

At decision block 308, a determination may be made as to whether a user input has been received. If not, then at block 310 a determination may be made as to whether the time since the last user input was received has exceeded a threshold. If no user input has been received for the threshold time period, then the routine 300 ends and the electronic device may power off or enter a standby mode. If the idle timeout has not been reached, then the routine 300 returns to decision block 308, and cycles until either a user input is received or the timeout threshold is reached.

If the determination at decision block 308 is that a user input has been received, then at decision block 312 the user input may be analyzed to determine whether it is a touchscreen swipe gesture (that is, a gesture in which the user's digit moves vertically and/or horizontally while in contact with the touchscreen). If so, then at block 314 a different custom UI element may be displayed. For example, the user interfaces described in FIGS. 2A-2C may be displayed in order to transition from display of a first custom UI element to display of a second custom UI element. If the user input is not a swipe gesture, the routine 300 proceeds to decision block 316.

It will be understood that the present disclosure makes reference to particular types of user input, such as swipe gestures on a touchscreen, for purposes of example only, and that the present disclosure is not limited to any particular type or form of user input. For example, in various embodiments, the user input received at decision block 308 may be a tap gesture on a touchscreen, a button press, a change in position or orientation of the electronic device (e.g., tilting or moving it), an input received via a wireless protocol, or any other user input.

At decision block 316, a determination may be made as to whether the user input was an actuation of a button (such as button 104A of FIGS. 1A-D), which may indicate an action associated with the currently displayed custom UI element should be performed. If so, then at block 318 performance of the associated action may be caused, illustratively by transmitting a request that is specific to the currently displayed custom UI element. For example, the associated action may be to place an order for a product, and the electronic device may initiate a connection (e.g., via a wireless network) to a network-based service and transmit a request to place the order, including parameters such as the requesting user, an order quantity, shipping method, payment method, and so forth. As a further example, the electronic device may transmit a device identifier and information identifying the currently displayed custom UI element, and the network-based service may identify the requesting user (based on the device identifier and/or other information), identify the action associated with the displayed element, and perform the associated action on behalf of the identified user. As a still further example, the associated action may be to change a scheduled delivery date, and the electronic device may transmit a request to the network-based service to change the delivery date and/or use a different delivery method.

In some embodiments, the electronic device may minimize power usage while carrying out routine 300 by only transmitting or receiving information at blocks 302 and 318. For example, the routine 300 may defer obtaining custom UI elements until it detects user input, or may initially obtain and store a plurality of custom UI elements and then poll a networked service for updates on an infrequent or as-needed basis. The routine 300 may also rely on a networked service to determine that the action associated with a custom UI element has changed, or to determine that the associated action can no longer be performed (e.g., because inventory is unavailable or the user is no longer eligible to perform the action) and/or to perform an alternate action. Examples of a system that processes actuation of a control that includes a custom UI element, and that performs an alternative action when the control's default action is unavailable, are provided in U.S. patent application Ser. No. 15/398,473, "Adaptive Performance of Actions Associated with Custom User Interface Controls," filed Jan. 4, 2017, the entirety of which is hereby incorporated by reference herein.

If the user input is not a button actuation, then at block 320 further processing of user input may be performed. It will be understood that further processing of user input may include decision blocks and user interface changes not depicted in FIG. 3 but similar to those depicted in blocks 312-318. For example, a determination may be made as to whether a user input is a tap gesture, and if so information regarding the action to be performed may be displayed. As a further example, a user input may be processed that causes the electronic device to display a different category of custom UI elements, to add or remove custom UI elements from the user interface, and so forth. In some embodiments, a user input may be processed that causes the electronic device to enter a standby mode and ends the routine 300.

In various embodiments, the blocks of routine 300 may be combined, omitted, or carried out in various orders. For example, decision blocks 312 and 316 may be carried out in either order. As a further example, block 304 may be omitted, and interfaces comprising a single custom UI element may be generated as needed (e.g., at blocks 306 and 314). Still further, decision block 310 may be omitted and the routine 300 may be carried out until some other condition is met, such as a specified number of actions performed.

Figure 4:
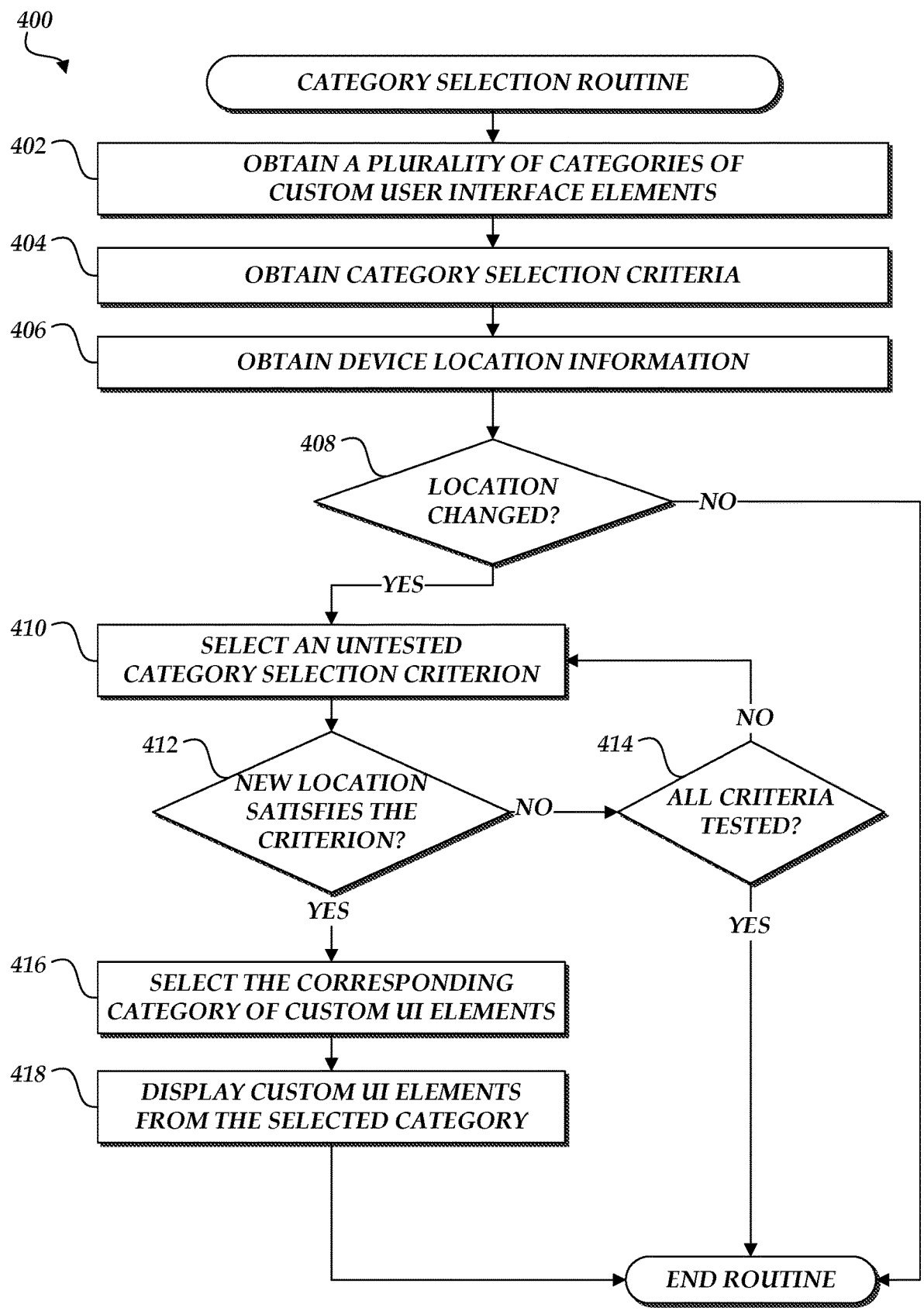
FIG. 4 is a flow diagram depicting an illustrative routine for selecting a category of custom user interface elements in accordance with aspects of the present disclosure.

FIG. 4 is a flow diagram depicting an illustrative category selection routine 400 for selecting a category of custom UI elements. The illustrative routine 400 may be carried out, for example, by an electronic device such as electronic devices 100A-D. At block 402, a plurality of categories of custom UI elements may be obtained. Illustratively, custom UI elements may be categorized according to characteristics such as a frequency of use, a location, a type of action or item associated with the element, user preferences, and/or other criteria. For example, the obtained categories may include a "kitchen" category for elements whose associated actions relate to the ordering of food and beverages, dishwashing detergent, and baking supplies; a "bathroom" category for cleaning supplies, tissue, and toiletries, an "office" category for pens, stationery, and office supplies; an "outdoors" category for athletic gear and sporting goods; and so forth. In further embodiments, the obtained categories may include categories for frequently used elements, recently used elements, seasonal items (e.g., cold weather gear or holiday items), or user-specified categories (e.g., wish-list items, favorites, etc.).

At block 404, category selection criteria may be obtained. Illustratively, the criteria may associate categories with geographic areas, such as rooms or buildings, and the selection criteria may indicate that the associated category should be selected when the electronic device is in one of the geographic areas. As a further example, categories may be associated with criteria such as dates and/or times, usage of the electronic device, the user of the electronic device, or other selection criteria.

At block 406, a location of the electronic device may be obtained. It will be understood that device location information is but one particular embodiment of information that may be obtained and compared to criteria in order to select a category of custom UI elements to display, and that other embodiments may obtain different information. For example, information identifying the user of the electronic device may be obtained, or information regarding prior usage of the electronic device.

At decision block 408, a determination may be made as to whether the location (or other information obtained at block 406) has changed since the routine 400 was last carried out. If not, the routine ends without changing the category of custom UI elements that are displayed by the electronic device. If the determination is that the location has changed, then at block 410 an untested criterion may be selected, and at decision block 412 a determination may be made as to whether the new location satisfies the selected criterion.

If the determination at decision block 412 is that the new location does not satisfy the selected criterion, then at decision block 414 a determination is made as to whether all criteria have been tested against the new location. If all criteria have been tested, and the new location did not satisfy any of the criteria, then the routine 400 ends without selecting a new category of custom UI elements to display. If further criteria remain to be tested, then the routine 400 branches to block 410 and selects an untested criterion.

If the determination at block 412 is that the new location satisfies the criterion, then at block 416 the category corresponding to the selection criterion may be selected. For example, the information obtained at block 406 may indicate that the device has been carried into a garage location, and the selection criteria may include a criterion that associates an "automotive" category of custom UI elements with that location. The determination at block 412 may therefore be that the new location satisfies the criterion for displaying the "automotive" category, and so the category may be selected. At block 418, a custom UI element from the selected category may be displayed.

Illustratively, the blocks of routines 300 and 400 may be combined in various embodiments. For example, the whole of routine 400 may be carried out within block 302 of the input processing routine 300, in order to initially obtain a plurality of custom UI elements. As a further example, blocks 308 and 408 may be combined or carried out in succession, thereby enabling processing of user input relative to categories of custom UI elements that are selected and displayed according to the selection criteria. As a still further example, the category selection routine 400 may process user input that indicates selection of a category, and may select and display the category accordingly.

FIG. 5 depicts a network topology including a network 550, a custom UI element data store 560, a networked-based service 570, and a general architecture of an electronic device 100, which includes an arrangement of computer hardware and software components that may be used to implement aspects of the present disclosure. The electronic device 100 may illustratively be one of the electronic devices 100A-D depicted in FIGS. 1A-1D. The network topology and the electronic device 100 may include many more (or fewer) elements than those shown in FIG. 5. It is not necessary, however, that all of these elements be shown in order to provide an enabling disclosure.

As illustrated, the electronic device 100 includes a processor 502, a touchscreen interface 504, a network interface 506, an actuatable button 508, and a data store 510, all of which may communicate with one another by way of a communication bus. The network interface 506 may provide connectivity to one or more networks (such as network 550) or computing systems and, as a result, may enable the electronic device 100 to receive and send information and instructions from and to other computing systems or services, such as the network-based service 570. In some embodiments, the network-based service 570 may be configured to process requests from the electronic device 100, such as requests to perform a specific action or to provide a plurality of custom UI elements, as described above. In further embodiments, the electronic device 100 may be preconfigured to communicate with the network-based service 570, may be configured through an initial setup process to establish a connection, or may determine the network-based service 570 based on criteria such as a location of the electronic device 100.

The processor 502 may also communicate to and from a memory 520. The memory 520 may contain computer program instructions (grouped as modules or components in some embodiments) that the processor 502 may execute in order to implement one or more embodiments. The memory 520 generally includes RAM, ROM, and/or other persistent, auxiliary, or non-transitory computer-readable media. The memory 520 may store an operating system 522 that provides computer program instructions for use by the processor 502 in the general administration and operation of the electronic device 100. The memory 520 may further store specific computer-executable instructions and other information (which may be referred to herein as "modules") for implementing aspects of the present disclosure. For example, the memory 520 may include a user interface module 524, which may perform various operations with regard to displaying the user interfaces described herein. For example, the user interface module 524 may manage the display of custom UI elements and manage the processing of user input regarding these elements.

In some embodiments, the memory 520 may include a category selection module 526, which may be executed by the processor 502 to perform various operations, such as those operations described with reference to FIG. 4. The memory 520 may further include custom UI elements 528 that are loaded into the memory 520 as various operations are performed. The custom UI elements 528 may be updated based on data received from a network-based service 570 on a periodic basis or in response to a triggering event recognized by the electronic device or an associated network-based service. In some embodiments, the network-based service 570 may obtain custom UI elements from the custom UI element data store 560 via the network 550. In other embodiments, the network-based service 570 may determine or generate custom UI elements, and the custom UI element data store 560 may be omitted or may be a component of the networked-based service 570.

While the operating system 522, the user interface module 524, and the category selection module 526 are illustrated as distinct modules in the memory 520, in some embodiments, the user interface module 524 and the category selection module 526 may be incorporated as modules in the operating system 522 or another application or module, and as such, separate modules may not be required to implement some embodiments. In some embodiments, the user interface module 524 and the category selection module 526 may be implemented as parts of a single application.

The electronic device 100 may connect to one or more networks 550 via the network interface 506. The network 550 may be any wired or wireless network, including but not limited to a local area network (LAN), wide area network (WAN), mesh network, cellular telecommunications network, the Internet, or any other public or private communications network or networks. In some embodiments, the network interface 506 may utilize protocols such as WiFi, Bluetooth, LTE, GPRS, TCP/IP, UDP, Ethernet, or other protocols to communicate via the network 550.

The electronic device 100, in some embodiments, may communicate with a custom UI element data store 560 via the network 550. The custom UI element data store 560 may illustratively be any non-transient computer-readable medium, including but not limited to hard drives, solid state devices, flash memories, EEPROMs, or other storage media. In various embodiments, the custom UI element data store 560 may be implemented as a database, a database server, a component of another server or service (e.g., the network-based service 570), or may be combined with the data store 510 and made internal to the electronic device 100.

In further embodiments, the electronic device 100 and the custom UI element data store 560 may communicate with a network-based service 570 via the network 550. The network-based service 570 may illustratively be any service that implements aspects of the present disclosure, including but not limited to aspects such as processing requests to identify and/or perform an action associated with a custom UI element. In some embodiments, the network-based service 570 may determine and/or provide custom UI elements, as described above.

It will be recognized that many of the components described in FIG. 5 are optional and that embodiments of the electronic device 100 may or may not combine components. Furthermore, components need not be distinct or discrete. Components may also be reorganized. For example, the electronic device 100 may be represented in a single physical device or, alternatively, may be split into multiple physical devices. In some embodiments, components illustrated as part of the electronic device 100 (such as the touchscreen interface 504) may additionally or alternatively be included in other computing devices, such that some aspects of the present disclosure may be performed by the electronic device 100 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by computing device, such as the electronic device 100. The electronic device may include one or more computers or processors. The code modules may be stored in any type of non-transitory computer-readable medium or other computer storage device. Some or all of the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. An electronic device comprising:
   a physical button coupled to a screen;
   a wireless interface;
   a touchscreen;
   a memory;
   a processor in communication with the physical button, the screen, the wireless interface, the touchscreen, and the memory; and
   computer-executable instructions stored in the memory that, when executed by the processor, cause the processor to perform operations comprising:
      obtaining information regarding a plurality of custom user interface elements, wherein each of the plurality of custom user interface elements is associated with a respective action;
      causing the touchscreen to display a first custom user interface element without displaying any other custom user interface element;
      causing the screen coupled to the physical button to display information about a first action associated with the first custom user interface element;
      receiving a first actuation of the physical button while the first custom user interface element is displayed on the touchscreen;
      in response to receiving the first actuation of the physical button:
         determining, based at least in part on the first custom user interface element being displayed while the first actuation is received, that the first action associated with the first custom user interface element should be performed; and
         sending a first network request via the wireless interface, wherein the first network request is for the first action to be performed with respect to a first item associated with the first custom user interface element;
      receiving a touch gesture via the touchscreen, the touch gesture indicative of navigating away from the first custom user interface element;
      in response to receiving the touch gesture:
         causing the touchscreen to stop displaying the first custom user interface element and begin displaying a second custom user interface element without displaying any other custom user interface element; and
         causing the screen coupled to the physical button to stop displaying the information about the first action associated with the first custom user interface element and begin displaying information about a second action associated with the second custom user interface element, wherein the second action is different than the first action;
      receiving a second actuation of the physical button while the second custom user interface element is displayed on the touchscreen; and
      receiving a second actuation of the physical button while the second custom user interface element is displayed on the touchscreen; and
      in response to receiving the second actuation of the physical button:
         determining, based at least in part on the second custom user interface element being displayed while the second actuation is received, that the second action associated with the second custom user interface element should be performed; and
         sending a second network request via the wireless interface, wherein the second network request is for the second action to be performed with respect to a second item associated with the second custom user interface element, wherein the second item is different than the first item.

2. The electronic device of claim 1, wherein the first action associated with the first custom user interface element comprises placing an order for the first item.

3. The electronic device of claim 1, wherein the touch gesture comprises a swipe gesture.

4. The electronic device of claim 1, wherein the plurality of custom user interface elements is associated with a category.

5. The electronic device of claim 4, wherein the operations performed by the processor further comprise determining the category based at least in part on a location of the electronic device.

6. The electronic device of claim 1, wherein the operations performed by the processor further comprise:
obtaining criteria for selecting a category of custom user interface elements from a plurality of categories of custom user interface elements; and
identifying, based at least in part on the criteria, a first category of the plurality of categories, wherein the plurality of custom user interface elements is associated with the first category.

7. The electronic device of claim 6, wherein identifying the first category comprises identifying a user-defined category.

8. The electronic device of claim 6, wherein a first criterion of the criteria for selecting a category specifies a geographic area, and wherein identifying the first category based at least in part on the criteria comprises:
determining that a location of the electronic device satisfies the first criterion; and
identifying a category associated with the first criterion as the first category.

9. The electronic device of claim 6, wherein identifying the first category based at least in part on the criteria comprises analyzing past usage of the electronic device to identify the first category.

10. The electronic device of claim 9, wherein the first category comprises custom user interface elements associated with the past usage of the electronic device.

11. The electronic device of claim 1, wherein the operations performed by the processor further comprise:
causing display of status information regarding a previously performed action on the touchscreen of the electronic device.

12. The electronic device of claim 1, wherein the touch gesture is a first touch gesture, and wherein the operations performed by the processor further comprise:
receiving, via the touchscreen, a second touch gesture; and
in response to the second touch gesture, causing display of information regarding an action associated with a displayed custom user interface element.

13. The electronic device of claim 12, wherein the first touch gesture is a swipe gesture, and wherein the second touch gesture is a tap gesture.

14. The electronic device of claim 1, wherein the first network request further identifies at least one of the electronic device, a user of the electronic device, an account associated with the electronic device, or a location of the electronic device.

15. A computer-implemented method comprising:
obtaining information regarding a plurality of custom user interface elements, wherein each of the plurality of custom user interface elements is associated with a respective action;
causing display of a first custom user interface element on an electronic device without causing display of any other custom user interface element;
receiving a first actuation of a first physical button of the electronic device while the first custom user interface element is displayed;
in response to receiving the first actuation:
determining, based at least in part on the first custom user interface element being displayed while the first actuation is received, that a first action associated with the first custom user interface element should be performed with respect to a first item associated with the custom user interface element; and
sending a first network request via a wireless interface of the electronic device, wherein the first network request is for the first action to be performed with respect to the first item associated with the first custom user interface element;
receiving a touch gesture via a first touchscreen of the electronic device, the touch gesture indicative of navigating away from the first custom user interface element;
in response to receiving the touch gesture, causing the electronic device to stop displaying the first custom user interface element and begin displaying a second custom user interface element without displaying any other custom user interface element;
receiving a second actuation of the first physical button while the second custom user interface element is displayed; and
in response to receiving the second actuation:
determining, based at least in part on the second custom user interface element being displayed while the second actuation is received, that a second action associated with the second custom user interface element should be performed with respect to a second item associated with the custom user interface element, wherein the second item is different than the first item; and
sending a second network request via the wireless interface, wherein the second network request is for the second action to be performed with respect to the second item associated with the second custom user interface element.

16. The computer-implemented method of claim 15, wherein a screen is coupled to the first physical button.

17. The computer-implemented method of claim 16, wherein causing display of the first custom user interface element comprises:
causing display of a first portion of the first custom user interface element on the first touchscreen; and
causing display of a second portion of the first custom user interface element on the screen coupled to the first physical button.

18. The computer-implemented method of claim 16, wherein the screen coupled to the first physical button comprises a second touchscreen that is separate from the first touchscreen.

19. The computer-implemented method of claim 18, wherein the first actuation comprises a touch gesture received via the second touchscreen.

20. The computer-implemented method of claim 16 further comprising:
receiving status information regarding the first action performed in response to the first network request; and
causing display of at least a portion of the status information on at least one of the first touchscreen or the screen coupled to the first physical button.

* * * * *